April 9, 1968  W. BOCK ETAL  3,377,452
LIGHTING OR ILLUMINATING DEVICE FOR SWITCHES
Filed Jan. 27, 1967  5 Sheets-Sheet 1

Inventors
WILLY BOCK
ERICH MUTSCHLER
FRANZ SCHREIBER

BY Dicke & Craig
ATTORNEYS

April 9, 1968 W. BOCK ETAL 3,377,452
LIGHTING OR ILLUMINATING DEVICE FOR SWITCHES
Filed Jan. 27, 1967 5 Sheets-Sheet 5

Inventors
WILLY BOCK
ERICH MUTSCHLER
FRANZ SCHREIBER
BY Micke + Craig
ATTORNEYS

United States Patent Office 3,377,452
Patented Apr. 9, 1968

3,377,452
LIGHTING OR ILLUMINATING DEVICE
FOR SWITCHES
Willy Bock and Erich Mutschler, Bietigheim, and Franz Schreiber, Kirchheim (Neckar), Germany, assignors to SWF-Spezialfabrik fur Autozubehor Gustav Rau GmbH, Bietigheim, Germany
Filed Jan. 27, 1967, Ser. No. 612,132
Claims priority, application Germany, May 9, 1966, S 103,705
15 Claims. (Cl. 200—167)

ABSTRACT OF THE DISCLOSURE

This application discloses a switch having one or more keys provided with means for selectively conducting first and second levels of illumination to the exposed key caps so as to indicate respective engaged and disengaged conditions of the key and simplify visual location thereof. A light conducting guide rod may be provided so as to conduct two different amounts of illumination depending upon the key condition or a shield or apertured diaphragm may be selectively rotated in front of the light source to provide the desired change in intensity. A variation in the color of the illumination may also be provided.

Background of the invention

Figure 1:
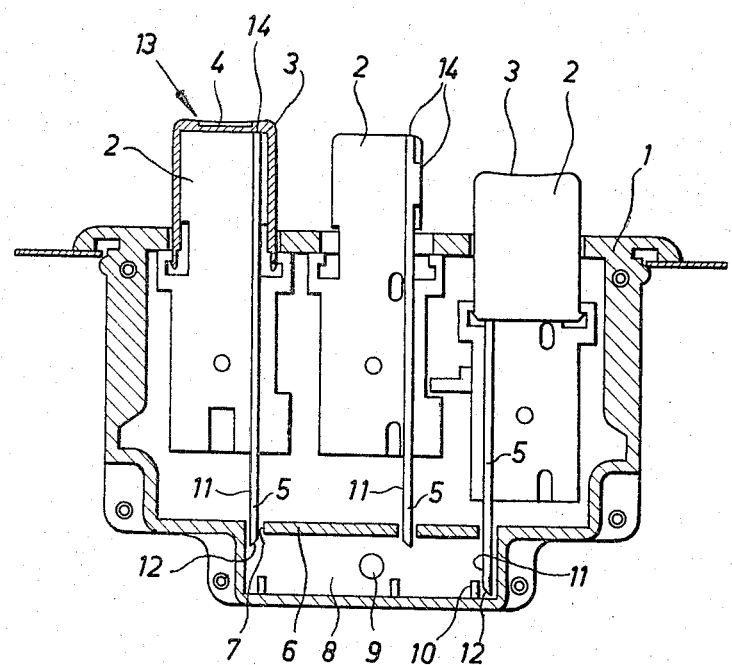

The invention relates to a lighting or illuminating device for switches and especially for motor vehicle switches having one or more actuating means.

For purposes of actuating, for example, the various lighting arrangements, the windshield wiper or the windshield washer, and other vehicle accessories, corresponding switches are provided on the instrument panel of the motor vehicle. However, these switches, for reasons of convenience and space, are arranged one next to the other in a compact organization. This presents the inherent disadvantage that during night driving a non-illuminated switch can be found only by scanning the key buttons, using both sight and touch which may result in driving errors endangering the welfare of the driver and those about him due to the inability to give complete attention to the driving of the vehicle.

There are, however, known switches with lighting devices associated therewith, but with these arrangements the key button of the switch lights up only when it is operated. During the search for the key button, the switch is in darkness and therefore inherently provides the same disadvantages as mentioned above.

Summary of the invention

It is the task of the invention to produce a switch of the kind mentioned above which does not incorporate the aforementioned disadvantages, but which identifies its position on the instrument panel and, therewith, the position and the switching condition of its switching keys or buttons at all times. The solution to the problem is accomplished by providing a simple light source in the switch which is, during operation of the vehicle, constantly energized and the intensity of the light rays or beams from this light source is controlled in its application to the individual key caps by means of light guiding means or light barriers according to the switching condition of the individual keys.

A further characteristic of the invention resides in the fact that the single light source constantly energized during operation of the vehicle is connected through light guide rods with the cap wall of each key which is visible outside the switch and is provided with symbols identifying respective ones of a number of keys.

In a modification of the invention the light guide rods are attached to the keys so that in the disengaged position, the light guide rod projects into the range of the light source so as to expose thereto only a small light entering surface and in the engaged position the light guide rod projects into the range of the light so as to expose thereto a large light entering surface. As a result, the keys may be exposed to two different levels of illumination in the two positions thereof. In addition, the large surface may be provided with a color coat so as to provide color variation in the two positions of the keys.

In another modification, the light guide rod may be provided with a light-penetrable sector, exposed to the light source during one condition of the switch and a partially translucent sector which is exposed to the range of the light source when the switch is in the other condition so as to produce two levels of illumination of the control key in contact with the light guide rod.

Furthermore, according to the invention, the light source may be arranged outside the control keys in a separate space, whereby, each control key in the engaged position, penetrates or extends into this space exposing a light-penetrable wall sector to the light source.

As a further embodiment, a sliding diaphragm may be arranged between the space of the light source and the cap of the control key which, corresponding to the switch position covers or makes free the path of the beam of light from the light source to the cap of the control key.

Instead of the sliding diaphragm, an elastic cover plate or a rotatably supported, angular shutter mask may be provided in the control key cap.

It is an object of the present invention to provide a switch of the type described which eliminates or otherwise entirely avoids the difficulties inherent in known devices of a similar nature.

It is another object of the present invention to provide a switch having illuminated identifying means capable of also indicating the operated condition of the switch.

It is a further object of the present invention to provide a switch of simple and inexpensive construction including integral illuminated indicia capable of identifying the operated condition of the switch by variation in light intensity or color.

Figure 2:
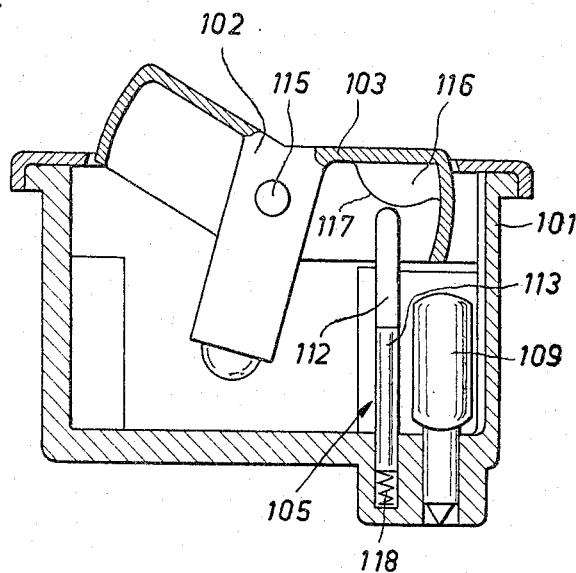
Figure 3:
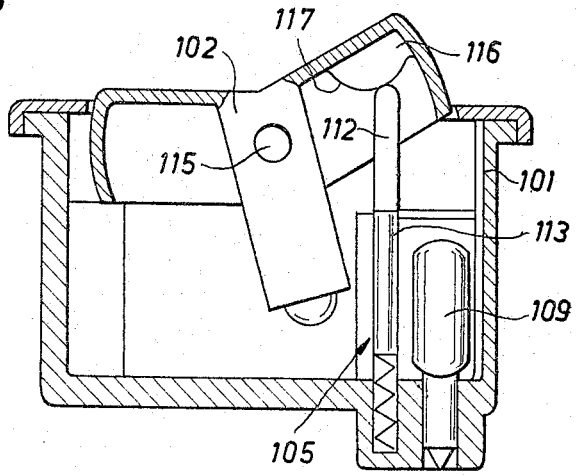
Figure 4:
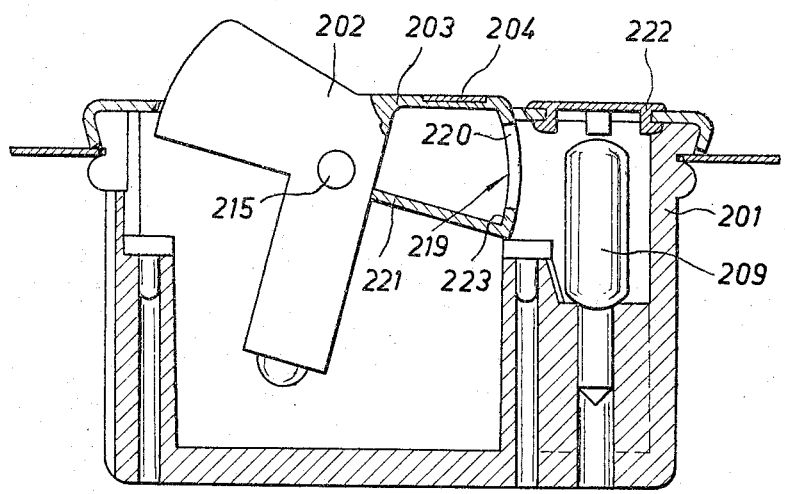
Figure 5:
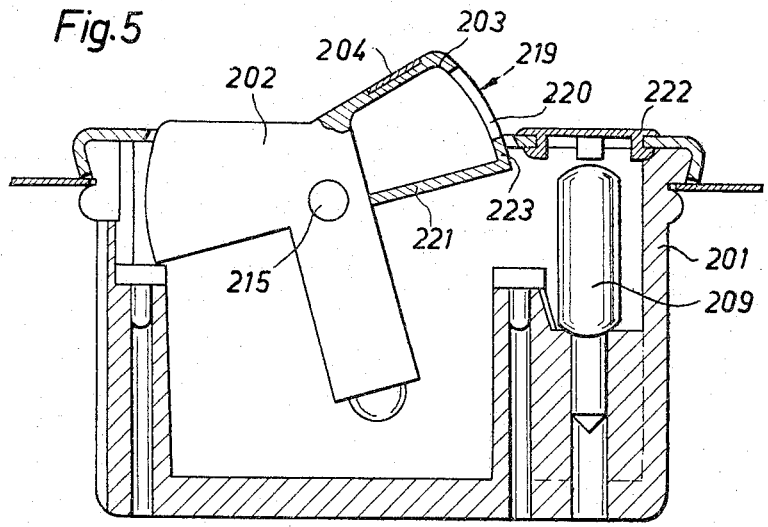

These and other objects, features and advantages of the present invention will become more apparent from the following detailed description thereof when taken in conjunction with the accompanying drawings, which disclose several embodiments of the present invention, and wherein FIGURE 1 shows a cross section of a press key switch having three press keys one of which is in the engaged position, FIGURE 2 shows a cross section through a press-key toggle switch in the engaged position, FIGURE 3 shows a press-key toggle switch according to FIGURE 2 in the disengaged position, FIGURE 4 shows a cross section of a further press-key toggle switch in the engaged position provided with an illumination device in accordance with the present invention, FIGURE 5 shows a press-key toggle switch according to FIGURE 4 in the disengaged position, and FIGURES 6 to 9 show cross sections of two further press-key toggle switches provided with shutters for covering and clearing, respectively, the ray path of the light source to the press-key cap.

Description of the preferred embodiments

In the housing of the press-key switch shown in FIG-

URE 1, three longitudinally movable press keys 2, are supported within a housing 1, and are provided with removable caps 3 upon the surface of which and visible from the outside are provided characteristic symbol grooves 4, which may also be provided in other forms. Light guide rods 5 are rigidly connected to the key 2, and may, for example, be made of clear or colored Plexigum. At the lower end of housing 1, a light barrier 6 in the form of a perforated plate or other shielding means is provided having openings 7 through which the light guide rods 5 extend. The rods 5 are provided with a prism-like inclined surface 12 at the free end thereof which extends beyond the light barrier 6 to penetrate a space 8 in which the light source 9 is arranged and which is separated from the switch housing 1 by the light barrier 6.

The prism-like inclined surfaces 12 of the light guide rods 5 are arranged in such a manner, that they face the light source 9 at a favorable light approach angle when the switch keys are in the disengaged position.

There is also provided in space 8, according to the number of keys provided on the switch, a plurality of covers 10 in the form of longitudinal strips or other shielding means which shield the prism-like surfaces 12 from the light source 9 in the engaged position of a respective switch key.

The prism-like inclined surface 12 of the light guide rod 5 is formed on its lower small surface and is completely transparent to light. A broad lateral surface 11 of the light guide rod 5 facing the light source 9 is provided with a light penetrable surface sector which is considerably larger than the inclined surface 12 and may be provided, for example, with a colored light transparent coating.

Now, in the preferred form of the invention, when the vehicle is being operated with the ignition on, the light source 9 is advantageously also automatically switched on. Thus, during all times when the vehicle is in operation light source 9 is energized providing illumination for the switch keys. However, it is also possible to switch on the light source 9, which may be infinitely variable to bright and dark, independently of the ignition by means of a door contact, the brake, by applying weight to the seat or through a twilight switch. With the light produced in this manner by the light source 9, a part or the entire inner space of the control keys 2 or only a portion or the entire housing edge may be lighted from illumination derived via the light source 9 and the individual light rods 5. In any event, the illumination is such that each key is clearly distinguishable.

In the specific case of the press-key switch according to FIGURE 1, the light from the light source 9 enters through the small inclined surface 12 of the light guide rod 5 and egresses again at the exit surface 14 so as to lightly illuminate the surface 13 of cap 3 which is provided with symbol groove 4. In this case, it is appropriate to arrange the light exit surface 14 of the light guide rod 5 directly behind the symbol 4 so that the symbol which is arranged in the cap or recessed in another wall of synthetic material may be made especially prominent. By providing the cap with a weakened wall corresponding to the form or shape of the symbol, more light will pass through the symbol than through the thicker adjacent walls so that the symbol appears brighter. This effect may be magnified when the surfaces around the symbol are covered with light impermeable means.

A further way of providing good perception of the symbol and therewith the corresponding key is accomplished by extending the light guide rod through the cap wall 13 so that it terminates flush with its surface, whereby the light guide rod 5 may be shaped so that its cross section corresponds to the shape of the symbol 4.

When, during commencement of a switching process, one control key is pressed, the light guide rod 5 extends into the space 8 in which the light source is arranged. With this operation, the inclined surface 12 of the depressed key is moved behind cover 10 to shield surface 12 and the light penetrable surface 11 comes into the range of the light rays of the light source 9. In this manner, more light reaches the key cap 3 so that it is illuminated with appreciably more brilliance than the other keys which were not pushed. If the light penetrable surface 11 is provided with a color coat, cap 3 appears correspondingly colored. By this means, and for normal illumination of a number of keys and for identifying their control position, only a single light source is required.

In FIGURES 2 and 3, a press-key toggle switch is illustrated whereby the press-key 102 is supported for pivoting around the point of rotation 115. Cap 103 of the press-key 102 is provided with a web-like wall portion 116 having a cam control surface 117 onto which the light conducting guide rod 105, longitudinally movable and guided in the switch housing 101, is pressed by means of a spring 118. Adjacent to the light guide rod 105, the light source 109 is arranged within a light barrier. At least the side of the light guide rod 105 facing the light source 109 is, in its upper portion 112, made clear as glass and in the lower portion 113 thereof is provided with a coated layer, for example, lacquered in black, which passes only a limited amount of light.

With the engagement of the press-key 102, the upper portion 112 is moved into the range of the light source 109 and the light passes thereby into the space of cap 103. During disengagement of the key, the coated sector 113 of the light guide rod 105 is moved into the range of the light source 109 and considerably less, that is, only control light, passes into the space of cap 103. The light intensity, however, is sufficient to identify the key.

FIGURES 4 and 5, also show a press-key toggle switch, the press-key 202 of which is pivotally supported around a center of rotation 215 in the switch housing 201. The cap 203 is provided, on a surface portion visible from the outside, with a symbol 204. The cap wall 219, which in the engaged position of the key illustrated in FIGURE 4 extends into the range of the light source 209, is provided with a light penetrable window 220 which may also be colored. All other parts of the switch, especially the bottom of the cap 221 are preferably made light impenetrable and form a barrier between the light source and the cap.

The light exit opening, in this embodiment, is constructed as an interchangeable cover gap 222 which may also be provided with symbols. The interchangeable cover cap 222 provides, at the same time, for an easy exchange of the light source 209 from the passenger compartment. Also, through the exchangeability of the cover cap 222, a matching of the symbols to the existing requirements is possible.

In the engaged position (FIGURE 4) the window 220 of key 202 is in the range of the light source 209 and the light rays extend into the inner space of cap 203 through the window 220 so that the symbol 204 is illuminated to identify the engaged condition. In the disengaged condition of key 202 (FIGURE 5) the edge 223 of the cap wall 219 is outside of the switch housing 201 so that no light rays may enter into the inner space of the cap 203. In this control condition, the cover cap 222 alone is illuminated by the light source 209 whereby the position of the switch and control key respectively is identified. In the alternative the surface 221 of the key 202 may be translucent to a limited extent so that in the disengaged condition of key 202, the symbol 204 will be illuminated with reduced intensity.

Figure 6:
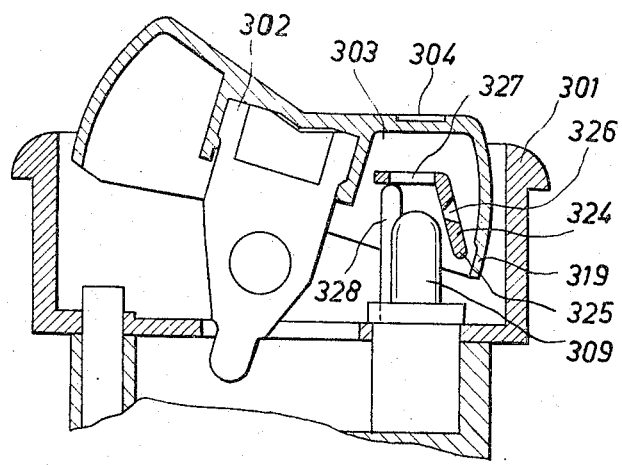
Figure 7:
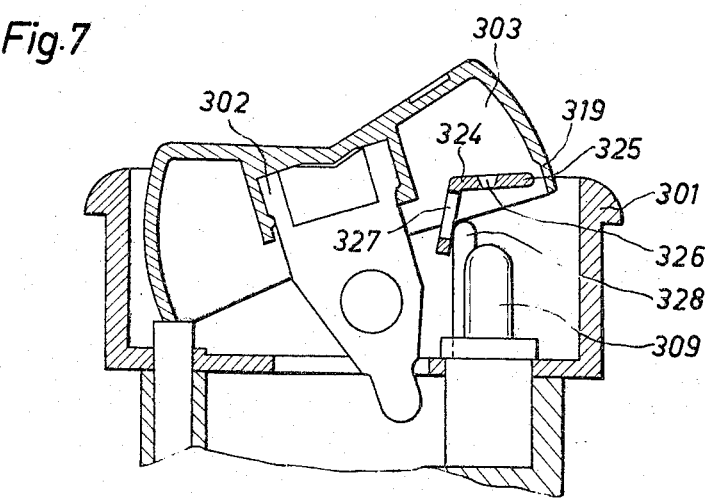

FIGURES 6 and 7 illustrate a further possibility for apportioning the quantity of the light rays of light source 309 to symbol 304 or the inner space of cap 303, respectively. For this purpose a barrier in the form of an angular shutter 324, rotatably supported at point 325 on the cap 303, is arranged in the cap wall 319. In this case, one leg of the angular shutter 324 is provided with a small light passage or opening 326 and the other leg is provided with a large light passage or opening 327. Further, a stop 328 is rigidly arranged in the switch housing on which the end of the angular shutter 324, facing away from the support point 325, is supported. In the disengaged position of key 302, the light rays of the light source 309 penetrate, in the main, through the small opening 326 of the angular shutter 324 so that the key is only lightly illuminated. However, the key is sufficiently illuminated that the symbol 304 is clearly identifiable. In the engaged position of the key, the large opening 327 is rotated in front of the light source 309 so that a great deal more light may pass into the inner space of cap 303 and the cap is thereby illuminated to a considerably brighter level than when in the disengaged position.

Figure 8:
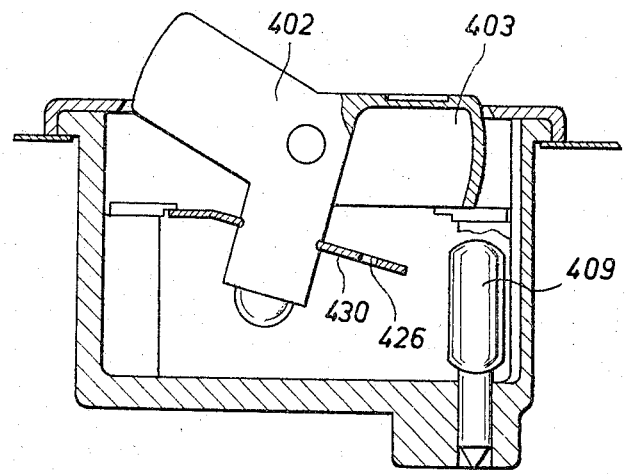

A further embodiment of the invention is illustrated in FIGURE 8 in which the key 402 is provided with a barrier in the form of a flexible plate 430 which, corresponding to the control position of press-key 402 opens or closes the light ray path of light source 409 into the inner space of cap 403. In the closed position, however, light from the light source 409 may pass into the inner space of cap 403 to a limited extent through an opening 426. This light intensity is, however, considerably smaller than that which reaches the cap space in the engaged position of the key.

Figure 9:
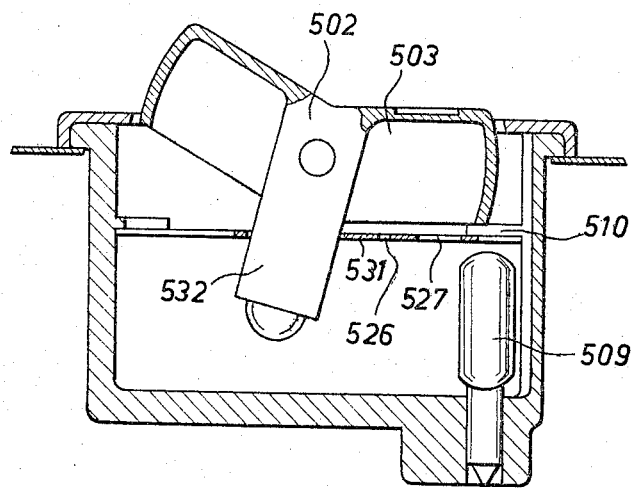

FIGURE 9 illustrates a further exemplified embodiment in which a shutter slide 531 is provided as part of a barrier for apportioning the quantity of light rays from the light source 509 into the inner space of cap 503. This slide is provided with two light entering openings 526 and 527. In the engaged condition of key 502, both openings 526 and 527 are in the range of the light source 509 so that a large quantity of light reaches the inner space of cap 503. In the disengaged condition of the key, the shutter slide 531 is shifted by means of the key shaft 532 in such a manner, that it is placed with its large opening 527 behind a cover 510 forming a further element of the barrier so that only light passing through the small light penetrable opening 526 may reach the inner space of cap 503.

While we have shown and described several embodiments of the present invention, it will be understood that the invention is not limited thereto but is susceptible of numerous changes and modifications as known to a person skilled in the art. For example, the device in accordance with the invention is not restricted to switches for motor vehicles, but may also serve as general purpose press-keys and press-key toggle switches. We therefore do not wish to be limited to the details shown and described herein, but intend to cover such modifications and changes as are within the scope of the appended claims.

We claim:

1. In combination with a switch arrangement having at least one key member including a translucent cap member movable between first and second positions for manually effecting a switching operation, illumination means for said key member comprising
    a light source and voltage source means for energizing said light source,
    a light impenetrable barrier means between said light source and said translucent cap member, and
    light conducting means for conducting light from said light source to said cap member at first and second levels of intensity in accordance with said first and second positions of said key member said light conducting means being in the form of a light conducting rod in contact with said cap member and extending through said barrier means in the first position of said key member at least in part so as to expose to said light source a limited light receiving surface and extending through said barrier means in said second position of said key member to a greater extent so as to expose to said light source an increased light receiving surface.

2. The combination defined in claim 1 wherein said switch arrangement includes a plurality of key members each including a translucent cap member provided with a characteristic symbol visible on the surface thereof.

3. The combination defined in claim 1 wherein said light conducting rod is secured at one end to said cap member and is provided at the other end thereof with a first light receiving surface in the end thereof and a second light receiving surface in the side wall thereof, said second light receiving surface being of substantially larger area than said first light receiving surface.

4. The combination defined in claim 3 wherein only said first light receiving surface extends through said barrier means in the first position of said key member, and both said first and second light receiving surfaces extend through said barrier means in said second position of said key member.

5. The combination defined in claim 4 further including shield means for shielding said first light receiving surface from said light source in the second position of said key member.

6. The combination defined in claim 3 wherein said light conducting rod has a cross-section in the shape of a symbol characteristic of said key member.

7. The combination defined in claim 3 wherein said second light conducting surface is provided with a colored coating.

8. The combination defined in claim 1 wherein said light conducting rod consists of a first portion capable of efficient receipt of light and a second portion only slightly receptive of light, said rod being positioned so that only said second portion extends through said barrier in the first position of said key member and both portions extend through said barrier means in the second position of said key member.

9. The combination defined in claim 8 wherein said light conducting rod is spring biased against movement to the position thereof corresponding to the second position of said key member.

10. In combination with a switch arrangement having at least one key member including a translucent cap member movable between first and second positions for manually effecting a switching operation, illumination means for said key member comprising
    a light source and voltage source means for energizing said light source,
    a light impenetrable barrier means between said light source and said translucent cap member, and
    light conducting means for conducting light from said light source to said cap member at first and second levels of intensity in accordance with said first and second positions of said key member,
    said light conducting means being in the form of at least one transparent window in a portion of said key member, said barrier means forming part of said key member and being positioned so as to permit communication between said window and said light source only in the second position of said key member.

11. The combination defined in claim 10 wherein said barrier means includes a partially transparent window in communication with said light source only in the first position of said key member.

12. In combination with a switch arrangement having at least one key member including a translucent cap member movable between first and second positions for manually effecting a switching operation, illumination means for said key member comprising
    a light source and voltage source means for energizing said light source,
    a light impenetrable barrier means between said light source and said translucent cap member, and
    light conducting means for conducting light from said light source to said cap member at first and second levels of intensity in accordance with said first and second positions of said key member,
said barrier means being pivotally mounted on said key member and said light conducting means consisting of first and second apertures of different diameter in said barrier means, and stop means for pivoting said barrier means with movement of said key member between its first and second positions so as to place respective ones of said first and second apertures in communication with said light source.

13. In combination with a switch arrangement having at least one key member including a translucent cap member movable between first and second positions for manually effecting a switching operation, illumination means for said key member comprising
   a light source and voltage source means for energizing said light source,
   a light impenetrable barrier means between the light source and said translucent cap member, and
   light conducting means for conducting light from said light source to said cap member at first and second levels of intensity in accordance with said first and second positions of said key member,
   said barrier means being connected to said key member and movable thereby from between said cap member and said light source upon movement of said key member between its first and second positions.

14. The combination defined in claim 13 wherein said barrier means has a light limiting aperture therein.

15. In combination with a switching arrangement having at least one key member including a translucent cap member movable between first and second positions for manually effecting a switching operation, illumination means for said key member comprising
   a light source and voltage source means for energizing said light source,
   a light impenetrable barrier means between said light source and said translucent cap member,
   light conducting means for conducting light from said light source to said cap member at first and second levels of intensity in accordance with said first and second positions of said key member,
   said barrier means including a shutter slide connected to said key member so as to be slidable thereby and said light conducting means consisting of first and second apertures in said shutter slide, and a further element of said barrier means blocking one of said apertures with the key member in the second position thereof.

References Cited

UNITED STATES PATENTS 3,144,643   8/1964   Anderson     200—167
3,213,269  10/1965   Melvin et al.   240—2

ROBERT K. SCHAEFER, *Primary Examiner.*

H. O. JONES, *Assistant Examiner.*